US012777380B2

(12) United States Patent
Dong et al.

(10) Patent No.: US 12,777,380 B2
(45) Date of Patent: Oct. 27, 2026

(54) METHODS, SYSTEMS AND DEVICES THAT PROVIDE FAST MOBILITY

(71) Applicant: ZTE CORPORATION, Shenzhen (CN)

(72) Inventors: Fei Dong, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 302 days.

(21) Appl. No.: 18/388,313

(22) Filed: Nov. 9, 2023

(65) Prior Publication Data

US 2024/0080725 A1 Mar. 7, 2024

Related U.S. Application Data

(63) Continuation of application No. PCT/CN2021/111009, filed on Aug. 5, 2021.

(51) Int. Cl.
*H04W 36/00* (2009.01)
*H04W 36/30* (2009.01)

(52) U.S. Cl.
CPC ... *H04W 36/0069* (2018.08); *H04W 36/0064* (2023.05); *H04W 36/00835* (2018.08); *H04W 36/00837* (2018.08); *H04W 36/305* (2018.08)

(58) Field of Classification Search
CPC ......... H04W 36/0069; H04W 36/0064; H04W 36/00835; H04W 36/00837; H04W 36/305; H04W 74/04; H04W 74/042; H04W 74/08; H04L 5/0048; H04L 5/001; H04L 5/0091; H04L 5/003; H04L 5/0053; H04L 5/0094; H04B 7/06; H04B 7/0686; H04B 7/0695
See application file for complete search history.

(56) References Cited

U.S. PATENT DOCUMENTS 11,838,883 B2 * 12/2023 Li ........................ H04B 7/0626
2020/0015236 A1 1/2020 Kung et al.
(Continued)

FOREIGN PATENT DOCUMENTS

CN 110691418 A 1/2020
WO WO 2020/146737 7/2020
WO WO-2022133692 A1 * 6/2022 ............ H04W 72/04

OTHER PUBLICATIONS

Extended European Search Report issued in European application No. 21952339.6, dated Nov. 29, 2024, 11 pages.
(Continued)

*Primary Examiner* — Mohamed A Kamara
(74) *Attorney, Agent, or Firm* — Crowell & Moring LLP

(57) ABSTRACT

The present disclosure relates to methods, systems, and devices for providing fast mobility. In one form, a processor of user equipment detects a trigger event associated with activating or switching to one or more transmission control indication (TCI) states of a TCI states set associated with a first physical cell ID (PCI) for uplink (UL) and downlink (DL) transmission when one or more TCI states for a TCI state set associated with a second PCI is used by the user equipment for at least one of UL or DL transmission in one serving cell. The processor of the user equipment may then perform a procedure of activating or switching to the one or more TCI states of a TCI state set associated with the first PCI for UL and DL transmission in one serving cell.

19 Claims, 8 Drawing Sheets

(56) References Cited

U.S. PATENT DOCUMENTS

| | | | | |
|---|---|---|---|---|
| 2020/0350972 | A1* | 11/2020 | Yi | H04B 7/022 |
| 2020/0351841 | A1 | 11/2020 | Cirik et al. | |
| 2021/0185614 | A1* | 6/2021 | Zhou | H04L 5/0048 |
| 2021/0400586 | A1* | 12/2021 | Awoniyi-Oteri | H04W 52/287 |
| 2022/0312286 | A1* | 9/2022 | Zhang | H04W 36/0061 |
| 2023/0216565 | A1* | 7/2023 | Kwak | H04B 7/0696 375/267 |
| 2023/0254741 | A1* | 8/2023 | Laddu | H04W 36/0072 370/331 |
| 2023/0337313 | A1* | 10/2023 | Yi | H04B 7/06964 |
| 2024/0023045 | A1* | 1/2024 | Da Silva | H04B 7/06968 |

OTHER PUBLICATIONS

Intel Corporation, "Enhancements to Multi-Beam Operation," R1-2103014, 3GPP TSG RAN WG1, #104bis-e, e-Meeting, Apr. 2021, 26 pages.

CATT, "Enhancements on Multi-Beam Operation," R1-2100343, 3GPP TSG RAN WG1,#104-e, e-meeting, Jan.-Feb. 2021, 17 pages.

International Search Report issued Mar. 30, 2022 in International (PCT) Application No. PCT/CN2021/111009.

Ericsson. "On L1 L2 Centric Inter-Cell Mobility" *3GPP tsg_ran WG2#114-e* , R2-2105999, May 10, 2021 (May 10, 2021), 2.1.2.

Ericsson. "Feature Lead Summary Beam Management-Thursday" *3GPP tsg_ran WG meeting #94*, R1-1809864, Aug. 23, 2018 (Aug. 23, 2018), the whole document.

Samsung. "DRAFT LS Reply on TCI State Update for L1L2-Centric Inter-Cell Mobility_rev" *3GPP tsg_ran wg2 meeting #114*, R2-2106315, May 27, 2021 (May 27, 2021), the whole document.

Chinese-language Office Action issued in Chinese Application No. 202180099156.8 dated Jul. 16, 2026 (7 pages).

Lenovo et al., "Discussion of beam failure recovery for carrier aggregation", 3GPP TSG RAN WG1 Meeting #92, R1-1804211, Apr. 16-20, 2018 (3 pages).

* cited by examiner

METHODS, SYSTEMS AND DEVICES THAT PROVIDE FAST MOBILITY

This application is a continuation application of PCT International Application No. PCT/CN2021/111009, filed with the China National Intellectual Property Administration, PRC on Aug. 5, 2021, which is herein incorporated by reference in its entirety.

TECHNICAL FIELD

This document is generally directed to wireless communications.

BACKGROUND

For wireless communication networks, L1/L2 centric mobility is introduced for performing a fast handover among different cells. Radio interface architecture and protocols standards such as radio access network RAN2 have generally split L1/L2 centric mobility models into two models: a multiple transmission and reception points (multi-TRP) model and an inter-Cell HO model. The multi-TRP model provides the ability for multiple cells to provide service to user equipment (UE). For example, user equipment may conduct a first transmission with a first cell and conduct a second transmission with a second cell. However, the multiple-TRP model take a deep impact on the current communication system.

SUMMARY

This document relates to methods, systems, and devices that provide fast mobility such that user equipment has the ability to activate and/or change a serving cell that it is communicating with.

In some implementations, a method for wireless communication includes: detecting, with a processor of user equipment, a trigger event associated with activating or switching to one or more transmission control indication (TCI) states of a TCI states set associated with a first physical cell ID (PCI) for uplink (UL) and downlink (DL) transmission when one or more TCI states for a TCI state set associated with a second PCI is used by the user equipment for at least one of UL or DL transmission in one serving cell; and performing, with the processor of the user equipment, a procedure of activating or switching to the one or more TCI states of a TCI state set associated with the first PCI for UL and DL transmission in one serving cell.

In some other implementations, a wireless communication apparatus comprises a processor and a memory, wherein the processor is configured to read code from the memory and implement a method as recited above.

In yet other implementations, a computer program product comprises a computer-readable program medium code stored thereupon, the code, when executed by a processor, causing the processor to implement a method as recited above.

The above and other aspects and their implementations are described in greater detail in the drawings, the descriptions, and the claims.

DETAILED DESCRIPTION

Figure 1:
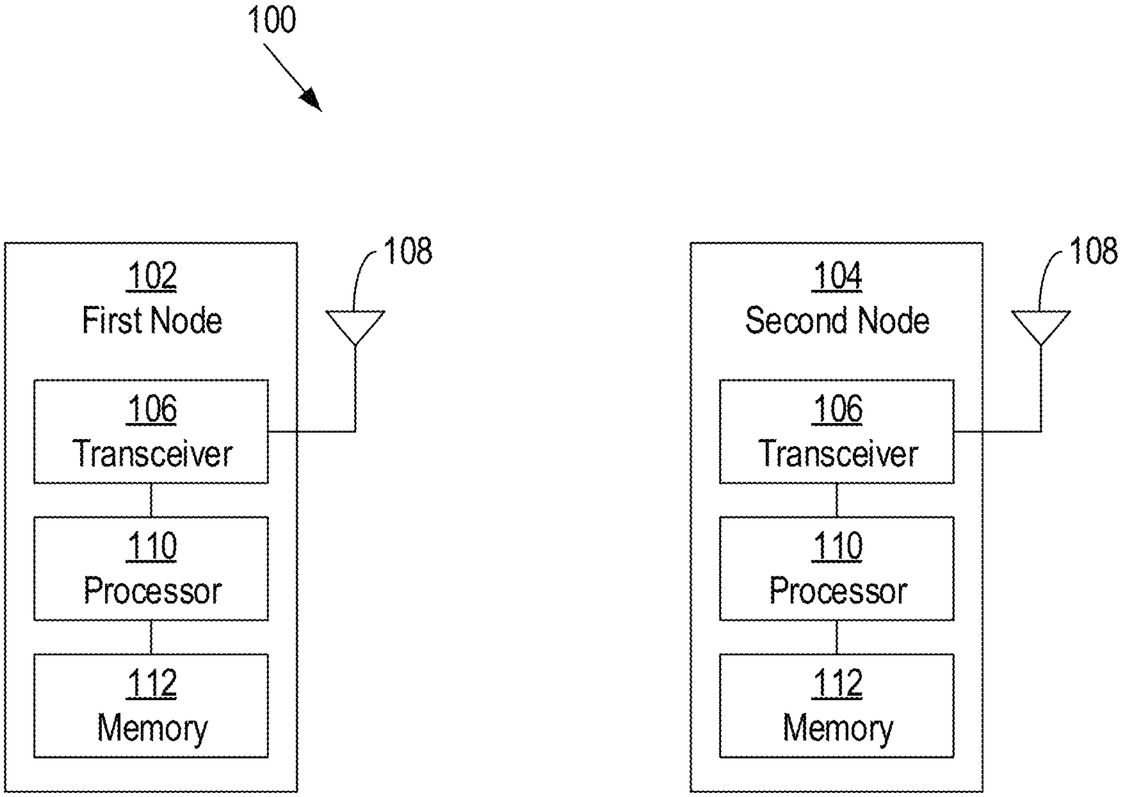
FIG. 1 shows an example of a wireless communication system.

The present disclosure relates to methods, systems, and devices that provide fast mobility. FIG. 1 shows a diagram of an example wireless communication system 100 where fast mobility may be implemented. In one form, the wireless communication system 100 includes a plurality of communication nodes that are configured to wirelessly communicate with each other. The communication nodes include a first node 102 and a second node 104. Various other examples of the wireless communication system 100 may include more than two communication nodes.

In general, each communication node is an electronic device, or a plurality (or network or combination) of electronic devices, that is configured to wirelessly communicate with another node in the wireless communication system, including wirelessly transmitting and receiving signals. In various implementations, each communication node may be one of a plurality of types of communication nodes.

One type of communication node is a user device. A user device may include a single electronic device or apparatus, or multiple (e.g., a network of) electronic devices or apparatuses, capable of communicating wirelessly over a network. A user device may include or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing devices that are not ordinarily moved for long periods of time, such as appliances, other relatively heavy devices including Internet of things (IoT), or computing devices used in commercial or industrial environments, as non-limiting examples).

A second type of communication node is a wireless access node. A wireless access node may comprise one or more base stations or other wireless network access points capable of communicating wirelessly over a network with one or more user devices and/or with one or more other wireless access nodes. For example, the wireless access node 104 may comprise a 4G LTE base station, a 5G NR base station, a 5G central-unit base station, a 5G distributed-unit base station, a next generation Node B (gNB), an enhanced Node B (eNB), or other base station, or network in various embodiments.

As shown in FIG. 1, each communication node 102, 104 may include transceiver circuitry 106 coupled to an antenna 108 to effect wireless communication. The transceiver circuitry 106 may also be coupled to a processor 110, which may also be coupled to a memory 112 or other storage device. The processor 110 may be configured in hardware (e.g., digital logic circuitry, field programmable gate arrays (FPGA), application specific integrated circuits (ASIC), or the like), and/or a combination of hardware and software (e.g., hardware circuitry (such as a central processing unit (CPU)) configured to execute computer code in the form of software and/or firmware to carry out functions). The memory 112, which may be in the form of volatile memory, non-volatile memory, combinations thereof, or other types of memory, may be implemented in hardware, and may store therein instructions or code that, when read and executed by the processor 110, cause the processor 110 to implement various functions and/or methods described herein. Also, in various implementations, the antenna 108 may include a plurality of antenna elements that may each have an associated phase and/or amplitude that can be controlled and/or adjusted, such as by the processor 110. Through this control, a communication node may be configured to have transmit-side directivity and/or receive-side directivity, in that the processor 110, and/or the transceiver circuitry 106, can perform beam forming by selecting a beam from among a plurality of possible beams, and transmit or receive a signal with the antenna radiating the selected beam.

Additionally, in various implementations, the communication nodes 102, 104 may be configured to wirelessly communicate with each other in or over a mobile network and/or a wireless access network according to one or more standards and/or specifications. In general, the standards and/or specifications may define the rules or procedures under which communication nodes 102, 104 can wirelessly communicate, which may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the communication nodes 102, 104 are configured to wirelessly communicate signals between each other. In general, a communication in the wireless system 100 between two communication nodes can be or include a transmission or a reception, and is generally both simultaneously, depending on the perspective of a particular node in the communication. For example, for a communication between the first node 102 and the second node 104, where the first node 102 is transmitting a signal to the second node 104 and the second node 104 is receiving the signal from the first node 102, the communication may be considered a transmission for the first node 102 and a reception for the second node 104. Similarly, where the second node 104 is transmitting a signal to the first node 102 and the first node 102 is receiving the signal from the second node 102, the communication may be considered a transmission for the second node 104 and a reception for the first node 102. Accordingly, depending on the type of communication and the perspective of a particular node, when a first node is communicating a signal with a second node, the node is either transmitting the signal or receiving the signal. Hereafter, for simplicity, communications between two nodes are generally referred to as transmissions.

Additionally, signals communicated between communication nodes in the system 100 may be characterized or defined as a data signal or a control signal. In general, a data signal is a signal that includes or carries data, such multimedia data (e.g., voice and/or image data), and a control signal is a signal that carries control information that configures the communication nodes in certain ways in order to communicate with each other, or otherwise controls how the communication nodes communicate data signals with each other. Also, particular signals can be characterized or defined as either an uplink (UL) signal or a downlink (DL) signal. An uplink signal is a signal transmitted from a user device to the wireless access node. A downlink signal is a signal transmitted from a wireless access node to a user device. Also, certain signals may defined or characterized by combinations of data/control and uplink/downlink, including uplink control signals, uplink data signals, downlink control signals, and downlink data signals.

For at least some specifications, such as 5G NR, an uplink control signal is also referred to as a physical uplink control channel (PUCCH), an uplink data signal is also referred to as a physical uplink shared channel (PUSCH), a downlink control signal is also referred to as a physical downlink control channel (PDCCH), and a downlink data signal is also referred to as a physical downlink shared channel (PDSCH).

Also, some signals communicated in the system 100 may be defined or characterized as reference signals (RS). In general, a reference signal may be recognized in the system 100 as a signal other than a shared channel signal or a control signal, although a reference signal may be an uplink reference signal or a downlink reference signal. Non-limiting examples of reference signals used herein, and as defined at least in 5G NR, include a demodulation reference signal (DM-RS), a channel-state information reference signal (CSI-RS), and a sounding reference signal (SRS). A DM-RS is used for channel estimation to allow for coherent demodulation. For example, a DMRS for a PUSCH transmission allows a wireless access node to coherently demodulate the uplink shared channel signal. A CSI-RS is a downlink reference signal used by a user device to acquire downlink channel state information (CSI). A SRS is an uplink reference signal transmitted by a user device and used by a wireless access node for uplink channel-state estimation.

Additionally, a signal may have an associated resource that, in general, provides or identifies time and/or frequency characteristics for transmission of the signal. An example time characteristic is a temporal positioning of a smaller time unit over which the signal spans, or that the signal occupies, within a larger time unit. In certain transmission schemes, such as orthogonal frequency-division multiplexing (OFDM), a time unit can be a sub-symbol (e.g., a OFDM sub-symbol), a symbol (e.g., a OFDM symbol), a slot, a sub-frame, a frame, or a transmission occasion. An example frequency characteristic is a frequency band or a sub-carrier in or over which the signal is carried. Accordingly, as an example illustration, for a signal spanning N symbols, a resource for the signal may identify a positioning of the N symbols within a larger time unit (such as a slot) and a subcarrier in or over which the signal is carried.

Figure 2:
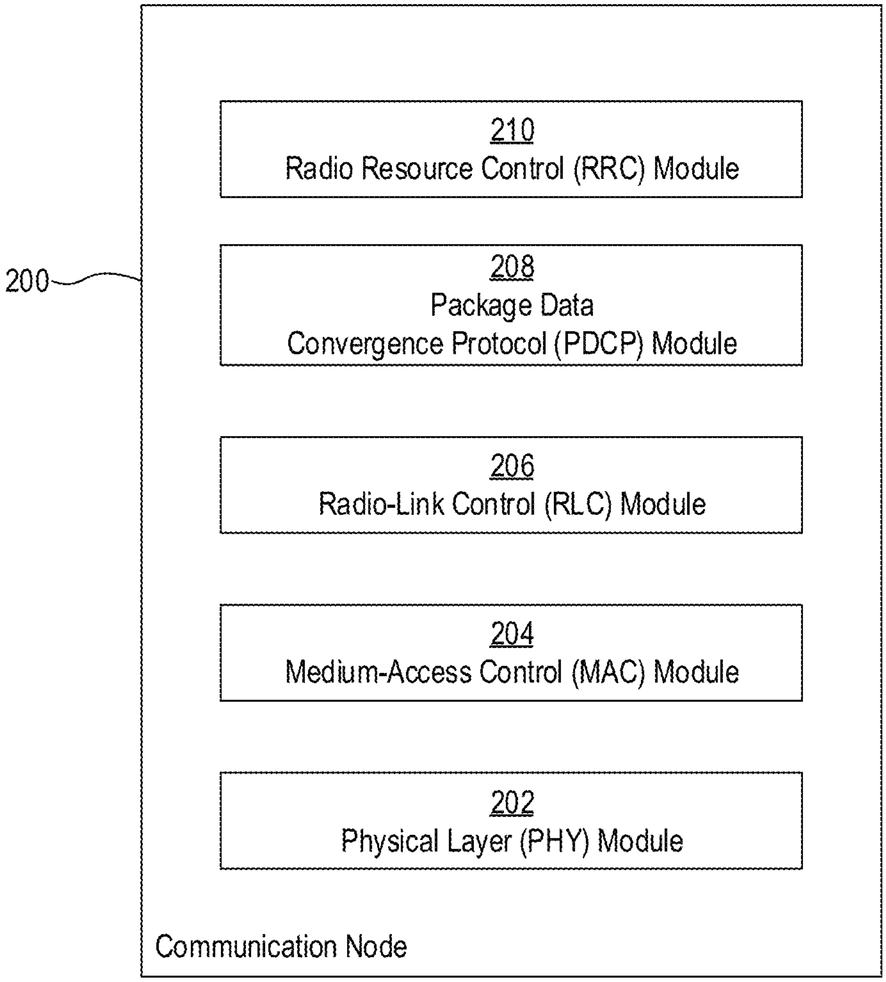
FIG. 2 shows example layers of a communication node of the wireless communication system of FIG. 1.

FIG. 2 shows a block diagram of a plurality of modules of a communication node 200, including a physical layer (PHY) module 202, a medium-access control (MAC) module 204, a radio-a link control (RLC) module 206, a package data convergence protocol (PDCP) module 208, and a radio resource control (RRC) module 210. In general, as used herein, a module is an electronic device, such as electronic circuit, that includes hardware or a combination of hardware and software. In various implementations, a module may be considered part of, or a component of, or implemented using one or more of the components of a communication node of FIG. 1, including a processor 110, a memory 112, a transceiver circuit 106, or the antenna 108. For example, the processor 110, such as when executing computer code stored in the memory 112, may perform the functions of a module. Additionally, in various implementations, the functions that a module performs may be defined by one or more standards or protocols, such as 5G NR for example. In various embodiments, the PHY module 202, the MAC module 204, the RLC module 206, the PDCP module 208, and RRC module 210 may be, or the functions that they perform may be, part of a plurality of protocol layers (or just layers) into which various functions of the communication node are organized and/or defined. Also, in various embodiments, among the five modules 202-210 in FIG. 2, the PHY module 202 may be or correspond to the lowest layer, the MAC module 204 may be or correspond to the second-lowest layer (higher than the PHY module 202), the RLC module 206 may be or correspond to the third lowest layer (higher than the PHY module 202 and the MAC module 204), the PDCP module 208 may be or correspond to the fourth-lowest layer (higher than the PHY module 202, the MAC module 204, and the RLC module 206), and the RRC module 210 may be or correspond to the fifth lowest layer (higher than the PHY module, the MAC module 204, the RLC module 206, and the PDCP module 208). Various other implementations may include more or fewer than the five modules 202-210 shown in FIG. 2, and/or modules and/or protocol layers other than those shown in FIG. 2.

The modules of a communication node shown in FIG. 2 may perform various functions and communicate with each other, such as by communicating signals or messages between each other, in order for the communication node to send and receive signals. The PHY layer module 202 may perform various functions related to encoding, decoding, modulation, demodulation, multi-antenna mapping, as well as other functions typically performed by a physical layer.

The MAC module 204 may perform or handle logical-channel multiplexing and demultiplexing, hybrid automatic repeat request (HARQ) retransmissions, and scheduling-related functions, including the assignment of uplink and downlink resources in both the frequency domain and the time domain. Additionally, the MAC module 204 may determine transport formats specifying how a transport block is to be transmitted. A transport format may specify a transport-block size, a coding and modulation mode, and antenna mapping. By varying the parameters of the transport format, the MAC module 204 can effect different data rates. The MAC module 204 may also control distributing data from flows across different component carriers or cells for carrier aggregation.

The RLC module 206 may perform segmentation of service data units (SDU) to suitably sized protocol data units (PDU). In various implementations, a data entity from/to a higher protocol layer or module is called a SDU, and the corresponding data entity to/from a lower protocol layer or module is called a PDU. The RLC module 206 may also perform retransmission management that involves monitoring sequence numbers in PDUs in order to identify missing PDUs. Additionally, the RLC module 206 may communicate status reports to enable retransmission of missing PDUs. The RLC module 206 may also be configured to identify errors due to noise or channel variations.

The package data convergence protocol module 208 may perform functions including, but not limited to, Internet Protocol (IP) header compression and decompression, ciphering and deciphering, integrity protection, retransmission management, in-sequence delivery, duplicate removal, dual connectivity, and handover functions.

The RRC module 210 may be considered one of one or more control-plane protocol responsible for connection setup, mobility, and security. The RRC module 210 may perform various functions related to RAN-related control-plane functions, including broadcast of system information; transmission of paging messages; connection management, including setting up bearers and mobility; cell selection, measurement configuration and reporting; and handling device capabilities. In various embodiments, a communication node may communicate RRC messages using signaling radio bearers (SRBs) according to protocols defined by one or more of the other modules 202-210.

Various other functions of one or more of the other modules 202-210 may be possible in any of various implementations.

Figure 3:
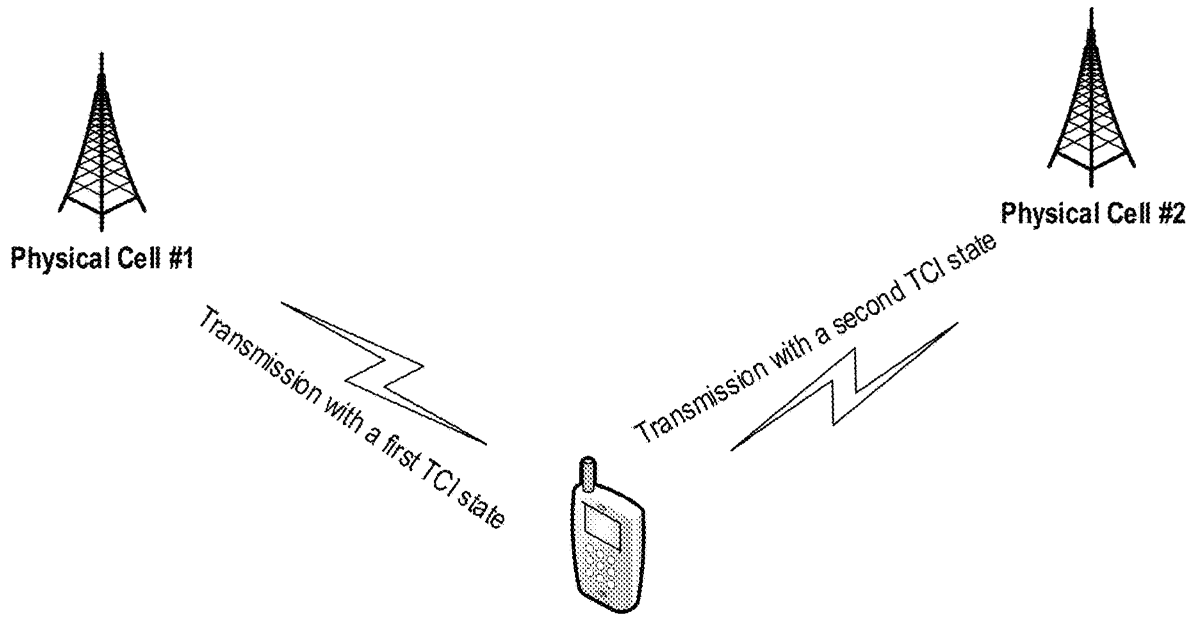
FIG. 3 illustrates conventional L1/L2 centric mobility.

As discussed above, for wireless communication networks, radio interface architecture and protocols standards such as radio access network RAN2 have generally split L1/L2 centric models into two models: a multiple transmission and reception points (multi-TRP) model and an inter-Cell HO model. The multi-TRP model provides the ability for more than one TCI states associated with diverse physical cell ID (PCI) to provide service to user equipment (UE) in one serving cell. For example, as shown in FIG. 3, user equipment may conduct a first transmission with a TCI state associated with a first PCI and conduct a second transmission with a TCI state associated with a second PCI. However, the multi-TRP model does not provide for the user equipment to quickly and efficiently change at least one of the TCI state sets that is currently serving the user equipment.

The present disclosure provides methods, systems, and devices that provide fast mobility within the multi-TRP model such that user equipment has the ability to activate and/or change TCI states in a serving cell that it is communicating with. In implementations described below, the TCI state sets associated with a first physical cell ID can be activated within a serving cell associated with a second PCI. The TCI states represents a beam used for an uplink transmission and/or a downlink transmission.

As described below, one feature of this protocol when compared to conventional systems is that at least one TRP transmission from the user equipment is associated with a different PCI than a current serving cell. From which, the user equipment is able to be served by the other cell without performing any layer 3 handover procedure which may cause the interruption of the data transmission.

By providing the ability to configure TCI states sets associated with a different PCI for one serving cell in this manner, it can minimize the impact on RAN-related control-plane functions and provide user equipment faster handover between serving cells.

In some implementations described herein, for one serving cell, user equipment can be configured with more than one TCI states (set) associated with diverse PCIs (e.g. a first PCI, a second PCI, etc.) and one of the TCI states (set) can be associated with a PCI that is equal to the PCI of a current serving cell.

The present disclosure provides at least three implementations for utilizing RRC signaling to configure a TCI state (sets) associated with a first PCI for uplink (UL) and downlink (DL) transmission when one or more TCI states for a TCI state set associated with a second PCI is currently used by user equipment for UL and/or DL transmission in one serving cell. It should be noted, however, that while implementations described herein are described with respect to TCI state sets associated with a first PCI for a serving cell associated with a second PCI, an auxiliary serving cell could be utilized in similar implementations to replace the TCI state set associated with a PCI that is different from the PCI of the serving cell. Accordingly, in this disclosure, a TCI state set associated with a PCI that is different from a PCI of a serving cell may represent, in some implementations, an auxiliary serving cell associated with the same PCI as the TCI state set.

In a first implementation, a list of auxiliary serving cells may be utilized for one serving cell, where for every auxiliary serving cell in the list, it includes all TCI states and/or spatial relationship information for indicating the beam used for the DL transmission and/or UL transmission that is associated with the auxiliary serving cell. In addition, it also includes the PCI of the auxiliary serving cell.

For example, user equipment may be configured with the list of auxiliary serving cells that the UE may be configured to. Each element of the list of auxiliary serving cells may include an information element providing at least one of: TCI states list for each auxiliary serving cell in the list, which may include at least one of: a TCI-state ID, a CSI-RS ID and/or related physical cell ID or serving cell ID, a synchronization signal block (SSB) and related PCI, or quasi-colocation (QCL) information; a spatial relationship list for each auxiliary serving cell in the list, which may include an information element providing at least one of: a spatial relationship ID, a CSI-RS ID and/or related serving cell ID or physical cell ID, an SSB and related PCI, or QCL information; PCI information; time advance (TA) related information, which may be time advance group (TAG) ID or TA indication; auxiliary serving cell ID; or an activation/deactivation flag.

In a second implementation, a list of the TCI states sets and/or spatial relationship sets for one serving cell is utilized, where for each TCI state set and/or spatial relationship set in the list, all TCI states and/or spatial relationships and corresponding physical cell information (i.e physical Cell ID) is provided.

For example, user equipment may be configured with the list of TCI state sets of the user equipment in one serving cell configuration. Each element of the list of TCI state sets may include an information element providing at least one of: a TCI state set ID; a list of the TCI states for each element of the list, which may include at least one of: a TCI-state ID, a CSI-RS ID and/or related serving cell ID or physical cell ID, a SSB and related PCI, or QCL information; TA information, which may be a TAG ID; a Physical Cell ID; or an activation/deactivation flag.

In another example, user equipment may be configured with a list of spatial relationship sets associated with the user equipment in one serving cell configuration. Each element of the list of spatial relationship sets may include an information element providing at least one of: a spatial relationship set ID; a list of a spatial relationship, for each element of the list, which may include at least one of: a spatial relationship ID, a CSI-RS ID and/or related serving cell ID or PCI, a SSB and related PCI, or QCL information; TA information, which may be the TAG ID; Physical Cell ID; or an activation/deactivation flag.

In a third implementation, a list of TCI states and/or Spatial Relationship for one formal serving cell is utilized, where for each TCI state and/or spatial relationship in the list, the TCI state/Spatial Relationship may include information regarding a physical cell (i.e., PCI).

For example, user equipment may be configured with a list of TCI states for the user equipment in one serving cell configuration. Each element of the list of TCI states may include an information element providing at least one of: a TCI-state ID; a CSI-RS ID and/or related serving cell ID; a SSB and related PCI; QCL information; or TA information.

In another example, user equipment may be configured with a list of spatial relationships with respect to the user equipment in one serving cell configuration. Each element in the list of spatial relationships may include an information element providing at least one of: a spatial relationship ID; a CSI-RS ID and/or related serving cell ID or PCI; a SSB and related PCI; QCL information; or TA information.

Figure 4:
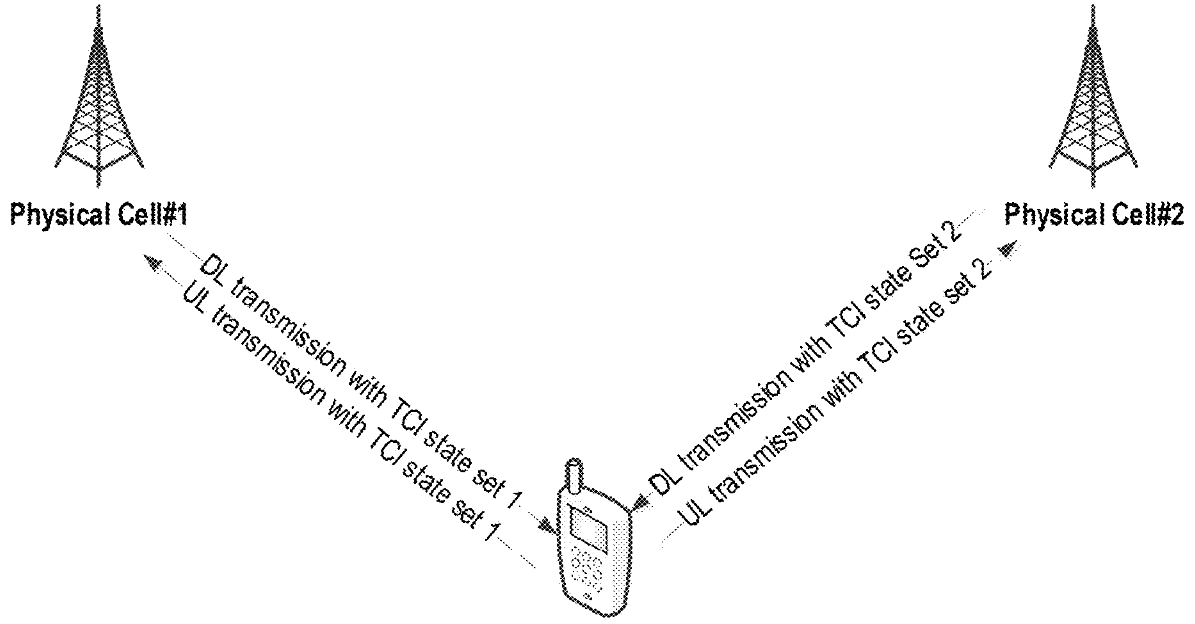
FIG. 4 illustrates user equipment simultaneously communicating with two physical cells using different transmission control indication (TCI) states.

Implementations of the present disclosure provide for fast mobility within a multi-TRP model such that user equipment has the ability to activate and/or change the TCI states sets in a serving cell that it is communicating with may operate in at least two manners. In some implementations, all TCI state sets associated with both a first PCI and a second PCI can be activated simultaneously for the user equipment. As shown in FIG. 4, for example, both TCI states sets are available for the user equipment simultaneously.

Figure 5:
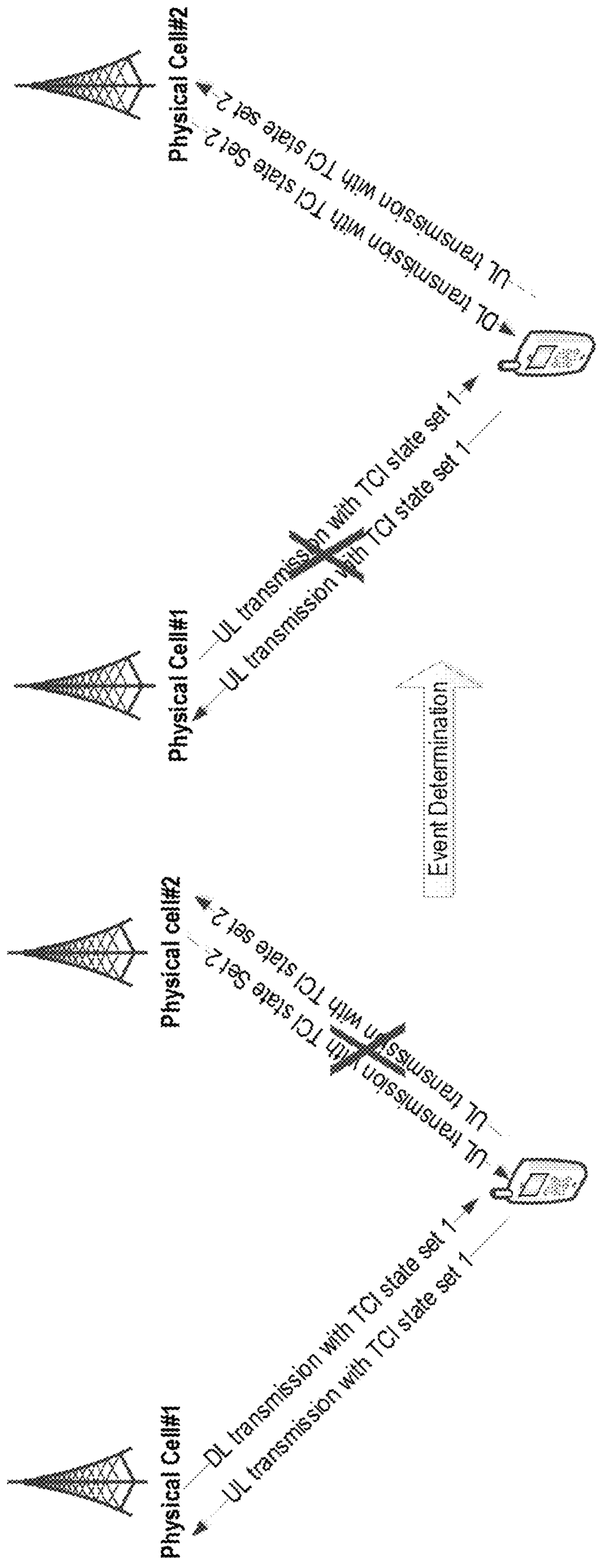
FIG. 5 illustrates user equipment alternatively communicating with two physical cells using difference TCI states.

In other implementations, only one set of TCI states may be activated for the user equipment at one time (i.e the TCI states set associated with the first PCI or the TCI states set associated with the second PCI). As shown in FIG. 5, for example, only one TCI state set can be activated for a serving cell at one time.

It will be appreciated that in some implementations such as those illustrated in FIGS. 4 and 5, either physical cell #1 or physical cell #2 can be a serving cell for the user equipment, where in other implementations another physical cell (not shown) may serve a serving cell for the user equipment. A serving cell may be consider to be a cell that is configured to user equipment and provides full service to the user equipment where a physical cell (sometimes also referred to an auxiliary cell) that is not a serving cell, generally, provides partial service or non-serve to the user equipment.

TCI state set activation and/or switch for uplink (UL) and downlink (DL) transmission may be performed by a user equipment mechanism or a network based mechanism The present disclosure describes implementations in which the user equipment performs operations for TCI state activation and deactivation for UL and DL transmission.

Figure 6:
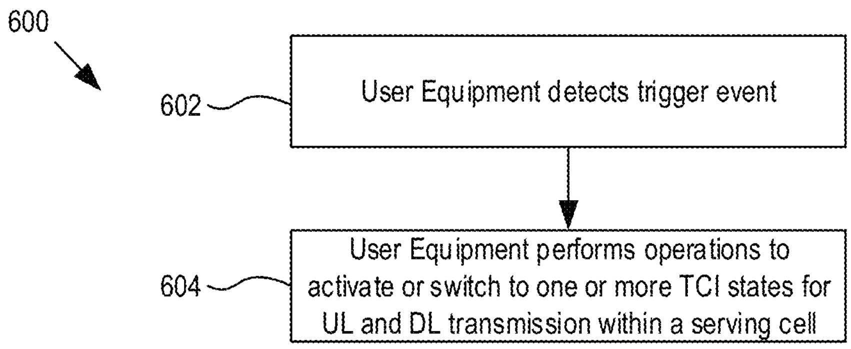
FIG. 6 is a flow chart of one form of a method for user equipment performing operations for a TCI state sets activation/switch procedure.

FIG. 6 is a flow chart of one form of a method 600 for user equipment performing operations for a TCI state sets activation/switch procedure. At step 602, user equipment detects a trigger event associated with activating or switching to one or more transmission control indication (TCI) states for a TCI state set associated with a first physical cell ID (PCI) for uplink (UL) and downlink (DL) transmission when one or more TCI states for a TCI state set associated with a second PCI is currently used by the user equipment for UL and/or DL transmission in one serving cell.

In some implementations, detecting a triggering event may include at least one of detecting deterioration of a reference signal received power (RSRP) or signal-to-interference-plus-noise-ratio (SINR) of a reference signal associated with the active TCI state sets associated with either the first PCI and/or the second PCI; detecting a radio link failure for an active TCI state set in a serving cell; detecting beam failure for active TCI state set associated with either first PCI or the second PCI; detecting reception of a medium access control (MAC) control element (CE) or download control information (DCI) from a wireless network; or detecting that a time advance obsolete associated with an active TCI state set associated with either first PCI or the second PCI.

Additionally, in some implementations of detecting deterioration of RSRP or SINR associated with the active TCI state set associated with the first PCI or the second PCI, the deterioration may be detected by the case that the COUNTER of an active TCI state set is greater than or equal to a maximum value. In one implementation, it may introduce a timer, a counter and a maximum value. In some implementations of the counter, the counter maybe incremented by one for each time an indication is received from the PHY layer, the counter maybe set to zero when the timer is expired or the TCI states activation/switch procedure is successfully terminated. In some implementations of a timer, the timer maybe started/restarted when receiving the indication from PHY layer, and the timer may be stopped by the TCI states sets activation/switch procedure being successfully terminated.

Additionally, in some implementations of detecting the radio link failure for an active TCI state set, a radio link failure is detected for a TCI state set associated with a first PCI.

Additionally, in some implementations of detecting the beam failure for an active TCI state set associated with a first PCI or a second PCI, where a beam failure is detected for a TCI state set associated with a first PCI but none of the suitable candidate beams can be found for the same PCI and/or there is at least one suitable candidate beam associated with the TCI states set associated with a second PCI can be found.

Additionally, in one implementation of detecting reception of the MAC CE or DCI for TCI state set activation/switch, the MAC CE may include at least one of the following information: (1) TCI state ID, (2) TCI state set ID, (3) Auxiliary serving cell ID, (4) Physical Cell ID, (5) a flag of activation/deactivation: which indicates the indicated TCI state ID, TCI state set ID, auxiliary serving cell ID to be activated/deactivated, (6) Control resource set ID, or (7) SearchSpace ID. The DCI may include at lease one of the following code point: (1) TCI state ID (2) TCI state set ID (3) Auxiliary serving cell ID, (6) Control resource set ID, or (7) SearchSpace ID.

Additionally, in some implementations of detecting an obsolete TA for an activated TCI states set associated with a first PCI or a second PCI, the timeAlignmentTimer of the TAG an active TCI state set associated with a first PCI belong to is expired and/or at least one TimeAlignmentTimer is still running of a TAG the TCI state set associated with a second PCI belong to.

At step 604, the user equipment then performs operations in response to the triggered events, which may include activating or switching to the one or more TCI states associated with the serving cell associated with the first PCI for UL and DL transmission within one serving cell associated with the second PCI.

In some implementations, performing one or more operations may include at least one of the following steps in response to the triggered events: step 1: selecting a suitable TCI states set to notify a wireless network of suitable TCI states set information by initiating a RACH procedure and/or sending a signaling; step 2: considering the TCI state activation/deactivation procedure as terminated successfully when receiving an acknowledgement (ACK) in response to the signal from the wireless network or the initiated RACH procedure being successfully terminated; and/or step 3: switching to or activating one or more TCI states for UL and DL transmission within one serving cell.

In some implementations, in response to detecting the deterioration of an active TCI states set associated with a first PCI, the user equipment may perform steps such as:

As a first step: selecting suitable TCI states set associated with a second PCI. In some implementations, the suitable TCI states set can be selected based on at least one of the following rules: (1) the RSRP or SINR of the reference signal for the TCI state set associated with a second PCI is above a threshold value, and the user equipment generates and sends to a wireless network a first MAC CE which may include the at least one of the following information: (1) auxiliary serving cell ID; (2) TCI state set ID; (3) TCI state ID; (4) Serving cell ID; (4) PCI; (5) activation/Deactivation flag, or a preamble which may be mapped to an SSB or CSI-RS for a TCI state set associated with the second PCI, (6) Control resource set ID, or (7) SearchSpace ID.

As a second step, the user equipment considers the TCI state set activation/switch procedure as terminated successfully or the requirement of activating the TCI state set associated with a second PCI indicated by the first MAC CE is confirmed when receiving an ACK from the wireless network (NW) in response to the signaling or the initiated RACH procedure being successfully terminated. In some implementations of an ACK, the ACK may have at least one of the following formats: (1) the UL grant to schedule the UL transmission on the same serving cell with the same HARQ process ID with the UL transmission of sending the signaling; (2) a DCI/a second MAC CE from NW to switch/activate the TCI state set for the same serving cell with the first MAC CE; (3) the deactivation of the serving cell where the active TCI state set associated with the first PCI is detected; or (4) The initiated RACH procedure is terminated successfully.

As a third step, the user equipment may apply the TCI state (set) indicated by the first MAC CE, the second MAC CE, the DCI, or a preamble for uplink transmission and/or downlink transmission in the serving cell. In some implementation, the user equipment may trigger a power headroom procedure for switching to/activating the TCI state set from which the current power headroom status information is reported to the network.

In some implementations, in response to detection of a radio link failure for an active TCI states set associated with a first PCI, user equipment may perform the following steps:

As a first step: the user equipment selects the suitable TCI states set associated with a second PCI. In some implementations, the suitable TCI states set can be selected with at least one of the following rules: (1) The RSRP or SINR of the reference signal for the TCI state set associated with a second PCI is above a threshold value; or (2) The radio link of the TCI state associated with a second PCI is not failed, and the user equipment generates and sends to the NW a first MAC CE which may include the at least one of the following information: (1) auxiliary serving cell ID; (2) TCI state set ID; (3) TCI state ID; (4) Serving cell ID; (4) PCI; (5) activation/deactivation flag, (6) Control resource set ID, (7)

SearchSpace ID or a preamble which maybe mapped to an SSB or CSI-RS for a TCI state set associated with the second PCI.

As the second step: the user equipment considers the TCI state set activation/switch procedure as terminated successfully or the requirement of activating the TCI state set associated with a second PCI indicated by the first MAC CE is confirmed when receiving an ACK from NW in response to the first MAC CE or the initiated RACH procedure being successfully terminated. In some implementations of an ACK, the ACK may be at least one of the following format: (1) the UL grant to schedule the UL transmission on the same serving cell with the same HARQ process ID with the UL transmission of sending the signaling; (2) a DCI/a second MAC CE from NW to switch/activate the TCI state set for the same serving cell with the first MAC CE; (3) The deactivation of the serving cell where the active TCI state set associated with the first PCI is detected; or (4) The initiated RACH procedure is terminated successfully.

As the third step: the user equipment may apply the TCI state set indicated by the first MAC CE, the second MAC CE, the DCI, or preamble for uplink transmission and/or downlink transmission in the serving cell. In some implementation, the user equipment may trigger a power headroom procedure for switching to/activating the TCI state set from which the current power headroom status information is reported to the network.

In some implementations, in response to a beam failure for an active TCI states set associated with a first PCI detected in a serving cell, for the first step: the user equipment selects the suitable TCI states set associated with a s second PCI in the serving cell. In some implementations, the suitable TCI states set can be selected by following the rules: (1) The RSRP or SINR of the reference signal (i.e SSB or CSI-RS) for the TCI state set associated with a second PCI is above a threshold value, and the user equipment generates and sends to the NW a first MAC CE which may include the at least one of the following information: (1) auxiliary serving cell ID; (2) TCI state set ID; (3) TCI state ID; (4) serving cell ID; (4) PCI; (5) activation/deactivation flag (6) SSB ID; (7) CSI-RS ID, or a preamble which maybe mapped to an SSB or CSI-RS for a TCI state set associated with the second PCI.

In a second step, user equipment may consider the TCI state set activation/switch procedure for the serving cell as terminated successfully or the requirement of activating or switching to the TCI state set associated with a second PCI indicated by the first MAC CE is confirmed when receiving an ACK from NW in response to the first MAC CE or the initiated RACH procedure being successfully terminated. In some implementations of an ACK, the ACK may be at least one of the following format: (1) the UL grant to schedule the UL transmission on the same serving cell with the same HARQ process ID with the UL transmission of sending the signaling; (2) a DCI/a second MAC CE from NW to switch/activate the TCI state set for the same serving cell indicated by the first MAC CE; (3) the deactivation of the serving cell where the active TCI state set associated with the first PCI is detected; or (4) The initiated RACH procedure is terminated successfully.

In a third step, the user equipment may apply the TCI state set indicated by the first MAC CE, the second MAC CE, the DCI, or preamble for uplink transmission and/or downlink transmission in the serving cell. In some implementation, the user equipment may trigger a power headroom procedure for switching to/activating the TCI state set from which the current power headroom status information is reported to the network.

In some implementations, in response to user equipment detecting an obsolete TA for an active TCI states set associated with a first PCI in a serving cell, for the first step: the user equipment may select the suitable TCI states set associated with a s second PCI in the serving cell. In some implementations, the suitable TCI states set can be selected with at least one of the following rules: (1) the RSRP or SINR of the reference signal (i.e SSB or CSI-RS) for the TCI state set associated with a second PCI is above a threshold value; (2) The timeAlignmentTimer of a TAG for a TCI state set associated with a second PCI is still running, and the user equipment generates and sends to the NW a first MAC CE which may include the at least one of the following information: (1) auxiliary serving cell ID; (2) TCI state set ID; (3) TCI state ID; (4) serving cell ID; (5) PCI; (6) activation/deactivation flag; (7) SSB ID; (8) CSI-RS ID; or a preamble which maybe mapped to an SSB or CSI-RS for a TCI state set associated with the second PCI.

For the second step, the user equipment considers the TCI state set activation/switch procedure for the serving cell as terminated successfully or the requirement of activating or switching to the TCI state set associated with a second PCI indicated by the first MAC CE is confirmed when receiving an ACK from the NW in response to the first MAC CE or the initiated RACH procedure being successfully terminated. In some implementations of an ACK, the ACK may be at least one of the following format: (1) the UL grant to schedule the UL transmission on the same serving cell with the same HARQ process ID with the UL transmission of sending the signaling; (2) a DCI/a second MAC CE from NW to switch/activate the TCI state set for the same serving cell indicated by the first MAC CE; (3) the deactivation of the serving cell where the active TCI state set associated with the first PCI is detected; or (4) the initiated RACH procedure is terminated successfully.

For the third step, the user equipment may apply the TCI state set indicated by the first MAC CE, the second MAC CE, the DCI, or preamble for uplink transmission and/or downlink transmission in the serving cell. In some implementation, the user equipment may trigger a power headroom procedure for switching to/activating the TCI state set from which the current power headroom status information is reported to the network.

In some implementations in response to the reception of a first MAC CE or a first DCI from NW, the user equipment may activate and/or switch to the TCI state set associated with a PCI indicated by the first MAC CE or a first DCI. In some implementation, the first MAC CE may include at least one of the following information: (1) auxiliary serving cell ID; (2) TCI state set ID; (3) TCI state ID; (4) serving cell ID; (5) PCI; (6) activation/deactivation flag; (7) SSB ID; (8) control Resource Set ID; (9) SearchSpace ID; or (10) CSI-RS ID. In some implementations, the first DCI may include at least one of the following codepoints: (1) auxiliary serving cell ID; (2) TCI state set ID; (3) TCI state ID; (4) serving cell ID; (4) PCI; (5) activation/deactivation flag; (6) SSB ID; (7) CSI-RS ID; (8) Control Resource Set ID; or (9) SearchSpace ID.

While the above-described implementations provide the ability for user equipment to activate and/or switch to a TCI state set associated with a PCI for UL/DL transmission in one serving cell which maybe associated with a different PCI, attention is also needed to random access procedure (RACH) resources for more than one TCI state sets associated with a different PCI in one serving cell which maybe associated with another different PCI.

Figure 7:
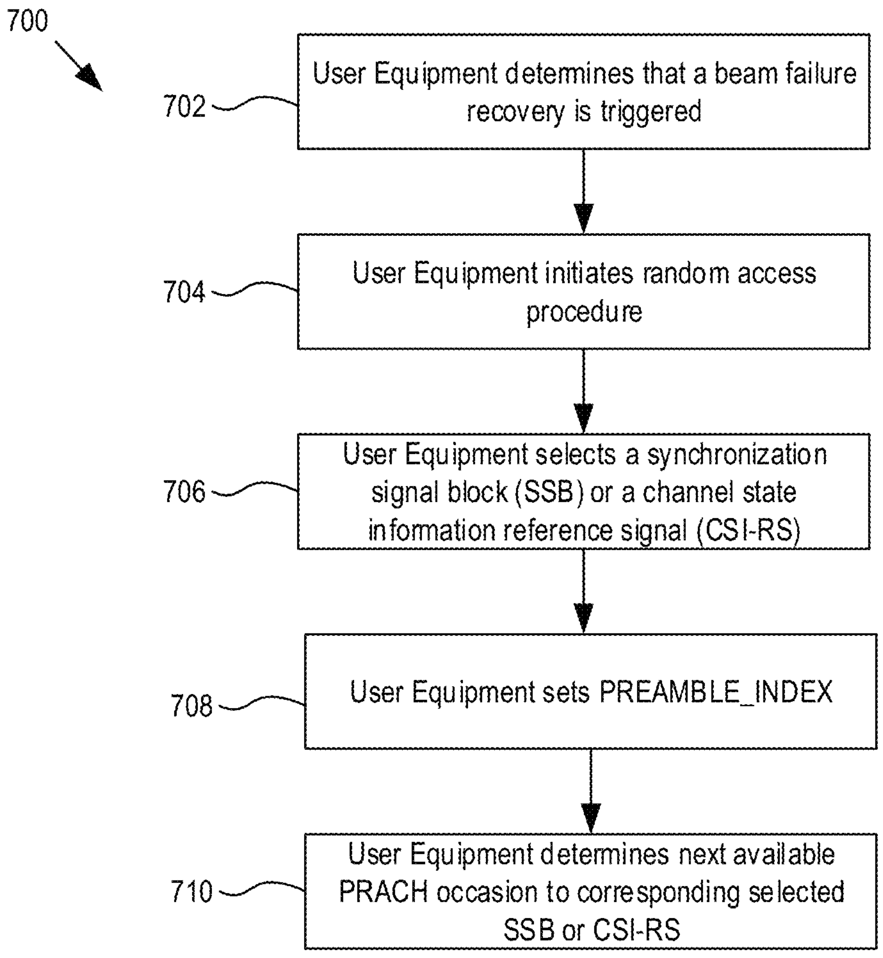
FIG. 7 is a flow chart of one form of a method for random access procedure (RACH) resource selection for contention free random access (CFRA) based beam failure recovery.

In some implementations, to distinguish RACH resources of the TCI state set associated with a first PCI from RACH resources of the TCI state set associated with a second PCI, an information element can be utilized for different RACH utilization. For example, for contention free random access (CFRA) in beam failure recovery, an information element BeamFailureRecoveryConfigFirstPCI may be utilized to configure the user equipment with RACH resources and candidate beams for beam failure recovery of the TCI state set associated with the first PCI. Similarly, an information element BeamFailureRecoveryConfigSecondPCI may be utilized to configure the user equipment with RACH resources and candidate beams for beam failure recovery of the TCI state set associated with the second PCI, and so on. More specifically, the information element BeamFailureRecoveryConfig may be utilized to configure the user equipment with RACH resources and candidate beams for beam failure recovery of the serving cell. In some implementations, information elements ssb-perRACH-Occasion-FirstPCI, candidateBeamRSListFirstPCI, and/or rach-ConfigBFRfirstPCI within the BeamFailureRecoveryConfig may be utilized as an alternative for providing the information about the candidate beam list for suitable beam selection and the RACH resources selection for beam failure recovery if a suitable beam of the TCI state set associated with the first PCI is selected. Similarly, information elements ssb-perRACH-OccasionSecondPCI, candidateBeamRSListSecondPCI, and/or rach-ConfigBFRSecondPCI within the BeamFailureRecoveryConfig may be utilized as an alternative for providing the information about the candidate beam list for suitable beam selection and the RACH resources selection for beam failure recovery if a suitable beam of the TCI state set associated with the second PCI is selected, and so on In another example, for contention based random access (CBRA), an information element RACH-ConfigCommon-FirstPCI may be utilized which specifies a random access parameter set and/or RACH-ConfigCommonTwoStepRA-FirstPCI may be utilized which specifies a 2-step random access parameter set for the TCI state set associated with a first PCI. Similarly, an information element RACH-ConfigCommonSecondPCI may be utilized which specifies a random access parameter set and/or RACH-ConfigCommonTwoStepRA-SecondPCI may be utilized which specifies a 2-step random access parameter set for the TCI state set associated with a second PCI, and so on. More specifically, the information element RACH-ConfigCommon may be utilized which specifies a random access parameter set and/or RACH-ConfigCommonTwoStepRA may be utilized which specifies a 2-step random access parameter set for the serving cell, FIG. 7 is a flow chart of one form of a method 700 for RACH resource selection for CFRA based beam failure recovery. At step 702, user equipment determines that a beam failure recovery (BFR) for a serving cell is triggered when beam failure is detected for the serving cell or for the TCI state set associated with a PCI. In some implementations, the beam failure for one serving cell is detected by the case that the BFI_COUNTER for one serving cell is great than or equal to a maximum value. In other implementations, the beam failure can be detected per TCI state set associated with a PCI by the case that the BFI_COUNTER for one TCI state set associated with a PCI is great than or equal to the maximum value.

At step 704, the user equipment initiates a random access procedure in the serving cell for performing the CFRA based beam failure recovery procedure. In some implementations, the selected beam information may be provided by the user equipment to NW via the information of a preamble transmission (MSG.1).

At step 706, the user equipment selects a synchronization signal block (SSB) or a channel state information reference signal (CSI-RS) for a TCI state associated with a first PCI according to a certain principle, where the SSB or the CSI-RS have a reference signaling received power (SSB-RSRP or CSI RSRP) that is above a threshold value.

In some implementations, at step 706, the principle can be at least one of the following: (1) the user equipment selects a SSB or CSI-RS from a candidate beam list for the TCI state set associated with the first PCI after failing to identify a suitable SSB or CSI-RS from a candidate beam list associated with the serving cell or/and a TCI state set associated with the second PCI; (2) the user equipment selects a SSB or CSI-RS from a candidate beam list for the TCI state associated with the first PCI when a RSRP of that SSB or CSI-RS is a highest among candidate beams for TCI state sets associated with both first PCI and second PCI; (3) the user equipment selects a SSB or CSI-RS from a candidate beam list for a TCI state set associated with the first PCI upon a flag, where in some implementations of a flag, the SSB or CSI-RS for indicated TCI state set associated with the indicated PCI (i.e the first PCI) whose RSRP is above a threshold is selected, if configured, otherwise, the SSB or CSI-RS from the candidate beam list associated with the serving cell is selected for which the RSRP is above a threshold; (4) the user equipment randomly selects an SSB or CSI-RS associated with a candidate beam for TCI state associated with the first PCI from candidate beam lists for TCI state sets associated both the first PCI and the second PCI; (5) The beam failure is detected for the TCI state sets associated with the first PCI; or (6) The beam failure is detected for the current active TCI state sets associated with first TCI.

At step 708, the user equipment sets a PREAMBLE_INDEX to a ra-PreambleIndex configured in the BeamFailureRecoveryConfigFirstPCI corresponding to the selected SSB or CSI-RS for preparing sending a preamble.

At step 710, the user equipment determines a next available PRACH occasion corresponding to a selected SSB or CSI-RS according to the information element BeamFailureRecoveryConfigFirstPCI for preparing sending a preamble.

Figure 8:
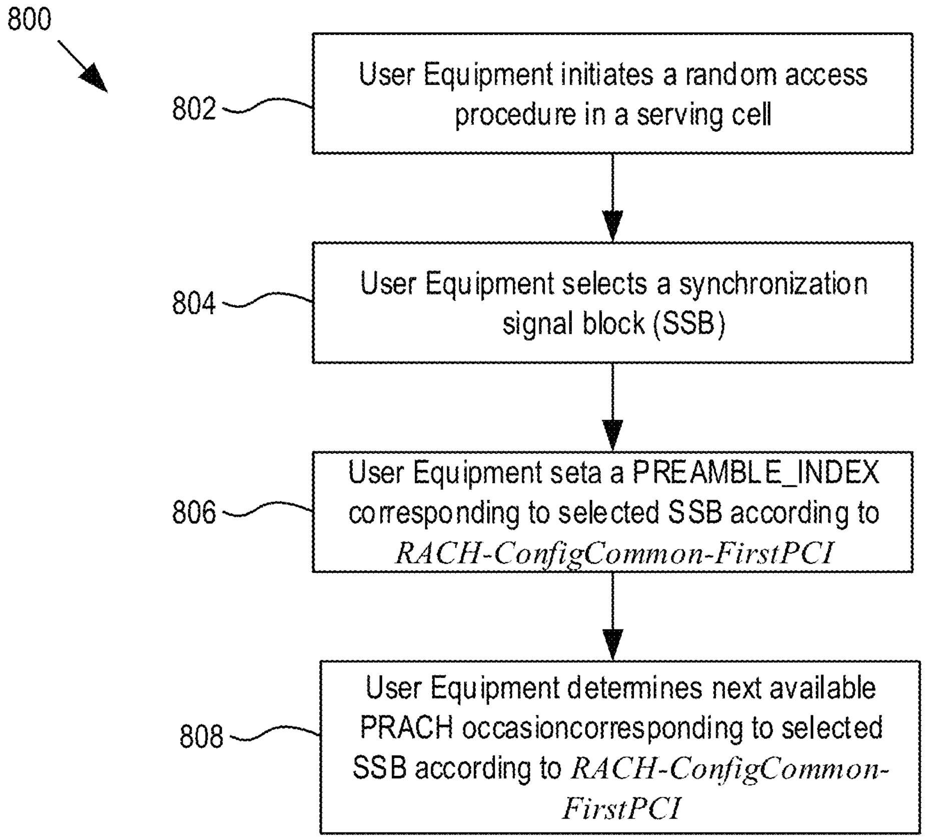
FIG. 8 is a flow chart of one form of a method for RACH resource selection for resource selection for contention based random access (CBRA).

FIG. 8 is a flow chart of one form of a method 800 for RACH resource selection for CBRA. At step 802, the user equipment initiates a random access procedure in one serving cell.

At step 804, the user equipment selects a synchronization signal block (SSB) associated with a TCI state associated with a first PCI according to a certain principle, the SSB having a reference signaling received power (SSB-RSRP) that is above a threshold value.

In some implementations, at step 804, the principle may be at least one of the following: (1) the user equipment selects a SSB associated with a first PCI that the TCI state set is associated with after failing to identify a suitable SSB associated with the second PCI and/or the serving cell; (2) the user equipment selects a SSB or CSI-RS associated with a first PCI that the TCI state set is associated with when a RSRP of that SSB is a highest among the SSBs associated with both the first PCI, the second PCI, and the serving cell; (3) the user equipment selects a suitable SSB from a candidate beam list for a TCI state set associated with the first PCI upon a flag, where in an implementation of the flag, the SSB associated with the indicated PCI (i.e, may be the first PCI) whose RSRP is above a threshold is selected, if configured, otherwise, the SSB with the PCI of the second PCI is selected for which the RSRP is above a threshold, the second PCI maybe the PCI of the serving cell; (3) the user equipment randomly selects an SSB of the first PCI from the SSBs associated with the first PCI, the second PCI and serving cell; (4) the beam failure is detected for the TCI state set associated with the first PCI; (5) the UL data is reaching, and the TimeAlignmentTimer of the TCI state set associated with the first PCI is expired; (6) the requirement of switch to/activate the TCI state set associated with the first PCI is triggered; or (7) the current active TCI state sets is associated with first PCI.

At step 806, the user equipment sets a PREAMBLE_INDEX corresponding to the selected SSB according to the RACH-ConfigCommon-FirstPCI for preparing sending a preamble.

At step 808, the user equipment determines a next available PRACH occasion from the PRACH occasions corresponding to the selected SSB according to the RACH-ConfigCommon-FirstPCI for preparing sending a preamble.

One of skill in the art will appreciate that because the UL transmission and/or DL transmission may be performed with the TCI state from the TCI states sets associated with different PCI in one serving cell, those TCI states sets may have different time advance (TA) values that inform user equipment by what amount of time the UE needs to advance UL transmissions. For this reason, user equipment may maintain different TA information in one serving cell.

For a user equipment to derive a TA for a TCI state set associated with a first PCI, the user equipment may be configured with an information element TimeDifferenceFirstPCI to indicate a time difference with the serving cell. Similarly, the user equipment maybe configured with an information element TimeDifferenceSecondPCI to indicate a time difference between a TCI state set associated with a second PCI and the serving cell, and so on. In some implementations, a MAC CE is sent to the user equipment to indicate a time difference between the TCI states sets associated with a first PCI and the serving cell, the MAC CE may include at least one of the following information: (1) the TA value, (2) the TCI state set ID, (3) PCI, or (4) Serving cell ID. For some implementations described herein, the second PCI maybe the PCI of the serving cell.

Figure 9:
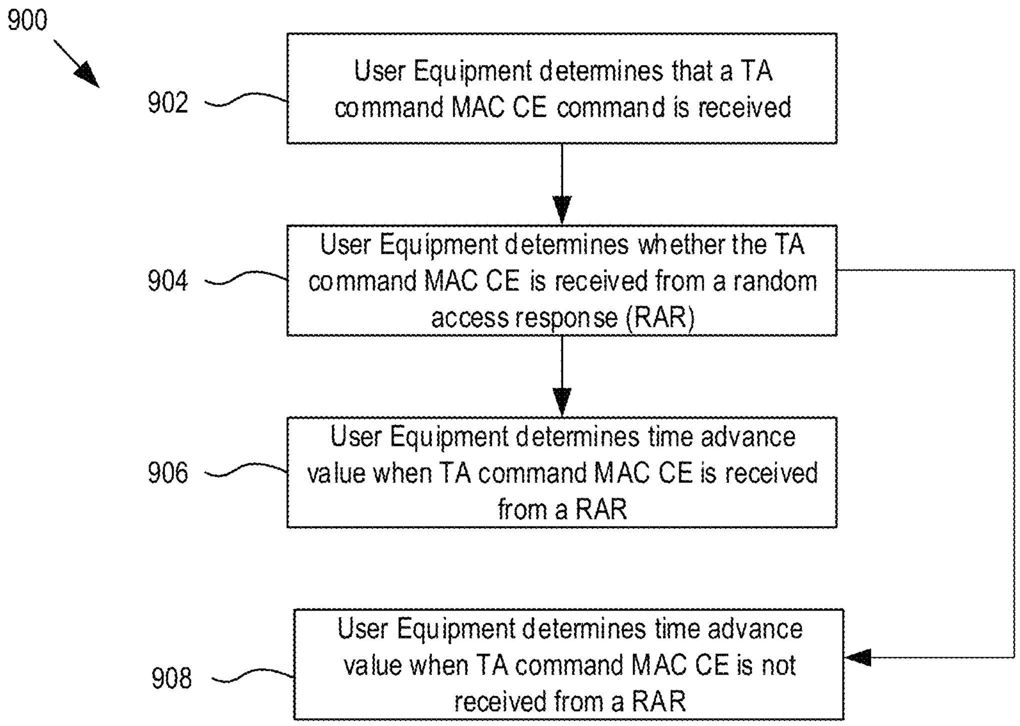
FIG. 9 is a flow chart of one form of a method for user equipment deriving a time advance value for a cell.

FIG. 9 is a flow chart of one form of a method 900 for user equipment deriving a time advance value for an auxiliary serving cell. At step 902, user equipment determines that a time advance (TA) command MAC CE is received for the TAG the auxiliary serving cell belong.

At step 904, the user equipment determines whether the TA command MAC CE is received from a random access response (RAR). In some implementations, the RAR is the Msg.2 for a RACH procedure which contains TA information and TC-RNTI information, and so on.

If the user equipment determines at step 904 that the TA command MAC CE is received from a RAR, at step 906, the user equipment calculates the time advance value according to the equation:

$$N_{TA\text{-}TCI\ state}=N_{TA}+(N_{TA\text{-}OFFSET}-31)\cdot 16\cdot 64/2^{\mu}$$

where $N_{TA}$ is a time advanced value for a time advance group (TAG) that a serving cell belongs to, the $N_{TA\text{-}OFFSET}$ is derived from a TimeDifferenceFirstPCI value or a MAC CE which represents a time advance difference between the TCI state sets associated with the first PCI and the second PCI, and μ represents an exponent value of a carrier space of a current BWP, for instance, 15 kHZ: μ=0, 30 kHZ, μ=1, 60 kHZ, μ=2, and so on.

If the user equipment determines at step 904 that the TA command MAC CE is not received from a RAR, at step 908, the user equipment calculates the time advance value according to the equation:

$$N_{TA\text{-}TCI\ state}=N_{old\text{-}TA}+(N_{TAreceived}+N_{TA\text{-}offset}-31)\cdot 16\cdot 64/2^{\mu}$$

where $N_{old\text{-}TA}$ is a maintained time advanced value for a time advance group (TAG) that a serving cell belongs to, $N_{TAreceived}$ represents the TA value received in TA command MAC CE, $N_{TA\text{-}OFFSET}$ is derived from a TimeDifference-FirstPCI value or a MAC CE which represents a time advance difference between TCI states sets associated with the first PCI and the second PCI, μ represents an exponent value of a carrier space of a current BWP, for instance, 15 kHZ: μ=0, 30 kHZ, μ=1, 60 kHZ, μ=2, and so on.

Figure 10:
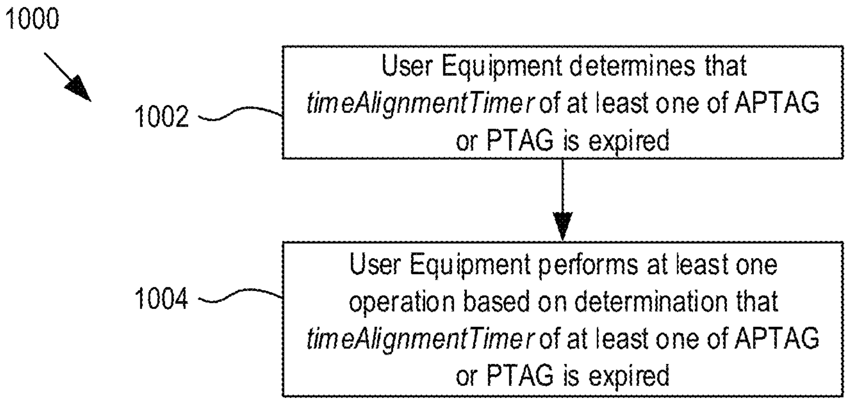
FIG. 10 is a flow chart of another form of a method for user equipment deriving a time advance value for a cell.

FIG. 10 is a flow chart of another form of a method 1000 for user equipment deriving a time advance value for a TCI state set associated with a PCI. In this form, a TCI state set may be associated with a time advance group (TAG), where the TAG can be a primary time advance group (PTAG), a secondary time advance group (STAG), or an auxiliary time advance group (ATAG), where a TAG used for a TCI state set associated with a PCI different from the PCI of the serving cell, where in some implementation, the ATAG can be split into APTAG, ASTAG. In some implementations, the TAG is defined such that the serving cells and/or TCI state sets belong to it may have the same TA value. In some implementations, each TAG may possess a TAG ID. In some implementations, user equipment may maintain a timer (i.e timeAlignmentTimer) for each TAG per active TCI state set associated with different PCIs in one serving cell, if configured. In some implementations, a timeAlignmentTimer utilized by the user equipment may control how long user equipment is considered to be aligned with a TAG.

At step 1002, user equipment may determine if a timeAlignmentTimer of at least one of an APTAG or a PTAG is expired for one serving cell Upon a determination at step 1002 that the timeAlignmentTimer of at least one of the APTAG or the PTAG has expired, at step 1004, the user equipment performs an action based on the determination. For example, when the timeAlignmentTimer of the APTAG is expired, the user equipment may consider all timeAlignmentTimers of the ASTAG to be expired and maintain Nta of all ATAGs. In another example, when a timeAlignmentTimer of PTAG is expired, the user equipment may consider the timeAlignmentTimers of the STAG and/or the ATAG to also be expired and maintain Nta of all TAGs. In yet another example, when a timeAlignmentTimers of all TAGs for all active TCI states sets in one serving cell is expired, the user equipment may consider the timer of all TAGs as expired and maintain Nta of all TAGs. In some implementations, the serving cell may be a special serving cell (SpCell) which is a primary cell to a master cell group or a secondary cell group. In some implementations, the Nta maintained for the TAG or ATAG is used for calculating the current TA value based on the received value difference from NW (i.e the difference between the old TA value and new TA value).

Figure 11:
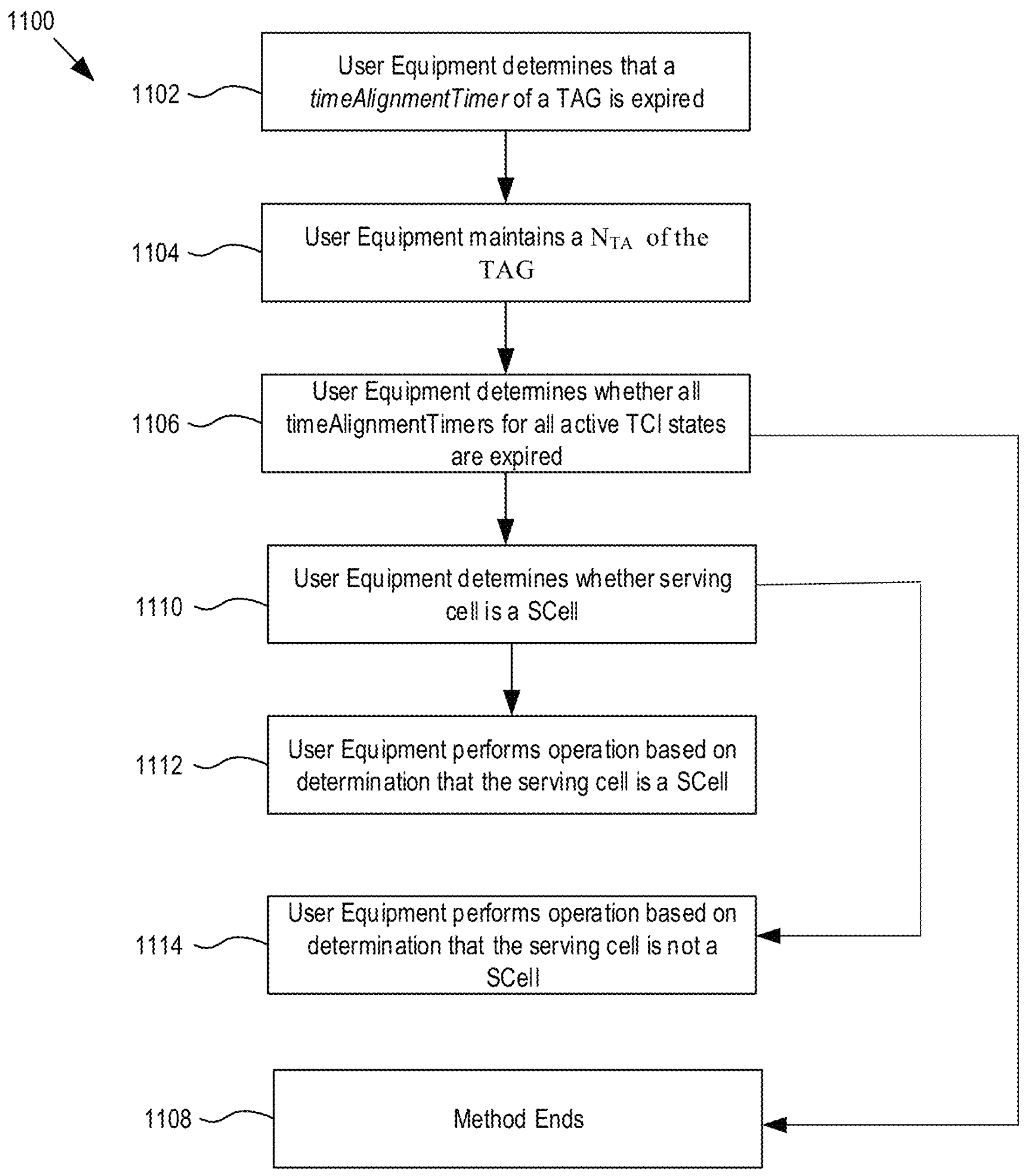
FIG. 11 is a flow chart of one form of a method for user equipment performing operations where an expiration of timeAlignmentTimers for different TAGs when more than one TCI state sets associated with PCIs are activated in one serving cell.

FIG. 11 is a flow chart of one form of a method 1100 for user equipment to deal with the issue where the expiration of the timeAlignmentTimers for different TAGs if more than one TCI state sets associated with the PCIs are activated in one serving cell. In this form, as described in more detail below, when the user equipment may perform at least one of: flush all hybrid automatic repeat request (HARQ) buffers; notify radio resource control (RRC) to release a physical uplink control channel (PUCCH), if configured; notify RRC to release s sound reference signal (SRS), if configured; clear any configured downlink assignments and configured uplink grants; or clear any PUSCH resource for semi-persistent CSI reporting.

At step 1102, user equipment determines that a timeAlignmentTimer of a TAG associated with an active TCI state set in the serving cell is expired.

At step 1104, the user equipment maintains a $N_{TA}$ (as defined in TS 38.211 [8]) of the TAG.

At step 1106, the user equipment determines whether all timeAlignmentTimers for all active TCI states sets in one serving cell are expired. When the user equipment determines that all timeAlignmentTimers for all active TCI state sets in one serving cell are not expired, the method ends at step 1108.

Alternatively, when the user equipment determines at step 1106 that all of the timeAlignmentTimers of the activated all active TCI states sets are expired, at step 1110, the user equipment determines whether a serving cell is a SCell.

When the user equipment determines at step 1110 that a serving cell is a SCell, at step 1112, the user equipment performs at least one of: flushing all hybrid automatic repeat request (HARQ) buffers; notifying radio resource control (RRC) to release a physical uplink control channel (PUCCH); notifying RRC to release SRS; clearing any configured downlink assignments and configured uplink grants; or clearing any physical uplink shared channel (PUSCH) resource for semi-persistent CSI reporting.

Alternatively, when the user determines at step 1110 that the serving cell is not a SCell, at step 1114, the user equipment performs at least one of: flushing all HARQ buffers for all Serving Cells; notifying RRC to release PUCCH for all Serving Cells, if configured; notifying RRC to release SRS for all Serving Cells, if configured; clearing any configured downlink assignments and configured uplink grants; or clearing any PUSCH resource for semi-persistent CSI reporting.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:

detecting, with a user equipment, a trigger event associated with activating or switching to one or more transmission control indication (TCI) states of a TCI states set associated with a first physical cell ID (PCI) for uplink (UL) and downlink (DL) transmission when one or more TCI states for a TCI state set associated with a second PCI is used by the user equipment for at least one of UL or DL transmission in one serving cell, wherein the first PCI is different from the second PCI; and performing, with the user equipment, a procedure of activating or switching to the one or more TCI states of a TCI state set associated with the first PCI for UL and DL transmission in the one serving cell;

determining that all timeAlignmentTimers for all active TCI states sets in the one serving cell are expired;

determining that the serving cell is an SCell after determining that all timeAlignmentTimers for all active TCI states sets in the serving cell are expired; and in response to determining that the serving cell is an SCell, performing at least one of the following with the user equipment:

flushing all hybrid automatic repeat request (HARQ) buffers;

notifying radio resource control (RRC) to release a physical uplink control channel (PUCCH);

notifying RRC to release SRS;

clearing any configured downlink assignments and configured uplink grants; or clearing any physical uplink shared channel (PUSCH) resource for semi-persistent CSI reporting.

2. The method of claim 1, wherein the triggering event comprises a detection of a deterioration of a reference signal received power (RSRP) or signal-to-interference-plus-noise-ration (SINR) associated with active TCI states (set) associated with the second PCI.

3. The method of claim 1, wherein the triggering event comprises a detection that a radio link failure for the activate TCI state set associated with the second PCI.

4. The method of claim 1, wherein the triggering event comprises a detection of a beam failure for active TCI state (set) associated with the second PCI.

5. The method of claim 1, wherein the triggering event comprises a medium access control (MAC) control element (CE) or download control information (DCI) received from a wireless network.

6. The method of claim 1, wherein the triggering event comprises a detection of a timeAlignmentTimer expiration of a TAG associated with an active TCI state set associated with the second PCI.

7. The method of claim 1, wherein detecting the triggering event comprises at least two of:

detecting deterioration of a RSRP or SINR associated with at the active TCI states (set) associated with a second PCI;

detecting a radio link failure for the active TCI state set associated with the second PCI;

detecting a beam failure for the active TCI state (set) associated with the second PCI;

detecting a MAC CE or DCI received from a wireless network; or detecting a timeAlignmentTimer expiration of a TAG associated with an active TCI state set associated with the second PCI.

8. The method of claim 1, wherein a procedure of the activating or switching to the one or more TCI states of a TCI states set associated with a first PCI for UL and DL transmission in the one serving cell comprises at least one of:

sending, with the user equipment, a signal to notify a wireless network of TCI state (set) switching or activation information;

receiving, with the user equipment, an acknowledgement of the signal from the wireless network; or switching to or activating, with the user equipment, one or more TCI states of a TCI state set associated with a first PCI for UL and DL transmission for the one serving cell.

9. The method of claim 8, wherein the signal to notify the wireless network of TCI state (set) comprises at least one of:

a TCI state requirement MAC CE; or a preamble.

10. The method of claim 8, wherein the acknowledgement of the signal from the wireless network comprises at least one of:

receiving a UL grant with a HARQ process ID which is equal to a HARQ process ID for sending a TCI state requirement MAC CE in the same serving cell;

receiving an indication that an initiated RACH procedure is successful terminated; or receiving a downlink control signal or TCI state switch confirmation MAC CE in response to the TCI state requirement MAC CE.

11. The method of claim 1, further comprising:

determining, with the user equipment, a time advance (TA) value for a TCI state that is being activated or switched to.

12. The method of claim 11, wherein the time advance value for the TCI state is calculated according to the equation in the case that the TA command MAC CE is received from a random-access response (RAR):

$$N_{TA\text{-}TCI\ state}=N_{TA}+(N_{TA\text{-}OFFSET}-31)\cdot 16\cdot 64/2^{\mu}$$

where $N_{TA}$ is a time advanced value for a time advance group (TAG) that a serving cell belongs to, the $N_{TA\text{-}OFFSET}$ is derived from a TimeDifferenceFirstPCI value or a MAC CE which represents a time advance difference between the TCI state sets associated with the first PCI and the second PCI, and μ represents an exponent value of a carrier space of a current BWP.

13. The method of claim 11, wherein the time advance value for the TCI state is calculated according to the equation in the case that a TA command MAC CE is not received from RAR:

$$N_{TA\text{-}TCI\ state}=N_{old\text{-}TA}+(N_{TAreceived}+N_{TA\text{-}OFFSET}-31)\cdot 16\cdot 64/2^{\mu}$$

where $N_{old\text{-}TA}$ is a maintained time advanced value for a time advance group (TAG) that a serving cell belongs to, $N_{TAreceived}$ represents the TA value received in TA command MAC CE, $N_{TA\text{-}OFFSET}$ is derived from a TimeDifferenceFirstPCI value or a MAC CE which represents a time advance difference between TCI states sets associated with the first PCI and the second PCI, and u represents an exponent value of a carrier space of a current BWP.

14. The method of claim 1, further comprising:

configuring, by a wireless network, a TAG ID for a TCI state set associated with the second PCI.

15. A wireless communication apparatus comprising:

a memory configured to store computer-readable instructions; and a processor circuitry configured to read the computer-readable instructions, the processor circuitry when executing the computer-readable instructions is configured to:

detect a trigger event associated with activating or switching to one or more transmission control indication (TCI) states of a TCI states set associated with a first physical cell ID (PCI) for uplink (UL) and downlink (DL) transmission when one or more TCI states for a TCI state set associated with a second PCI is used for at least one of UL or DL transmission in one serving cell, wherein the first PCI is different from the second PCI; and perform a procedure of activating or switching to the one or more TCI states of a TCI state set associated with the first PCI for UL and DL transmission in the one serving cell;

determine that all timeAlignmentTimers for all active TCI states sets in the one serving cell are expired;

determine that the serving cell is an SCell after determining that all timeAlignmentTimers for all active TCI states sets in the serving cell are expired; and in response to determining that the serving cell is an SCell, perform at least one of the following:

flush all hybrid automatic repeat request (HARQ) buffers;

notify radio resource control (RRC) to release a physical uplink control channel (PUCCH);

notify RRC to release SRS;

clear any configured downlink assignments and configured uplink grants; or clear any physical uplink shared channel (PUSCH) resource for semi-persistent CSI reporting.

16. A non-transitory machine-readable media, having instructions stored on the machine-readable media, the instructions configured to, when executed, cause a machine to:

detect a trigger event associated with activating or switching to one or more transmission control indication (TCI) states of a TCI states set associated with a first physical cell ID (PCI) for uplink (UL) and downlink (DL) transmission when one or more TCI states for a TCI state set associated with a second PCI is used for at least one of UL or DL transmission in one serving cell, wherein the first PCI is different from the second PCI; and perform a procedure of activating or switching to the one or more TCI states of a TCI state set associated with the first PCI for UL and DL transmission in the one serving cell;

determine that all timeAlignmentTimers for all active TCI states sets in the one serving cell are expired;

determine that the serving cell is an SCell after determining that all timeAlignmentTimers for all active TCI states sets in the serving cell are expired; and in response to determining that the serving cell is an SCell, perform at least one of the following:

flush all hybrid automatic repeat request (HARQ) buffers;

notify radio resource control (RRC) to release a physical uplink control channel (PUCCH);

notify RRC to release SRS;

clear any configured downlink assignments and configured uplink grants; or clear any physical uplink shared channel (PUSCH) resource for semi-persistent CSI reporting.

17. The wireless communication apparatus of claim 15, wherein the processor circuitry is configured to:

detect deterioration of a RSRP or SINR associated with at the active TCI states (set) associated with a second PCI;

detect a radio link failure for the active TCI state set associated with the second PCI;

detect a beam failure for the active TCI state (set) associated with the second PCI;

detect a MAC CE or DCI received from a wireless network; or detect a timeAlignmentTimer expiration of a TAG associated with an active TCI state set associated with the second PCI.

18. The wireless communication apparatus of claim 15, wherein the processor circuitry is configured to:

send a signal to notify a wireless network of TCI state (set) switching or activation information;

receive an acknowledgement of the signal from the wireless network; or switch to or activate one or more TCI states of a TCI state set associated with a first PCI for UL and DL transmission for the one serving cell.

19. The wireless communication apparatus of claim 15, wherein the processor circuitry is further configured to:

determine a time advance (TA) value for a TCI state that is being activated or switched to.

* * * * *